US008042847B2

(12) United States Patent  
Garg et al.

(10) Patent No.: US 8,042,847 B2  
(45) Date of Patent: Oct. 25, 2011

(54) TRAY ENERGY ABSORBER AND BUMPER SYSTEM

(75) Inventors: Ankit Kumar Garg, Bangalore (IN); Abhijit Mahato, Jharkhand (IN); Takaaki Nemoto, Shizuoka (JP)

(73) Assignee: Sabic Innovative Plastics IP B.V. (NL)

(*) Notice: Subject to any disclaimer, the term of this patent is extended or adjusted under 35 U.S.C. 154(b) by 500 days.

(21) Appl. No.: 11/959,605

(22) Filed: Dec. 19, 2007

(65) Prior Publication Data

US 2009/0160203 A1 Jun. 25, 2009

(51) Int. Cl.
*B60R 19/18* (2006.01)

(52) U.S. Cl. .................... 293/102; 293/120; 296/187.04

(58) Field of Classification Search ............. 296/187.09, 296/187.04; 293/102, 120
See application file for complete search history.

(56) References Cited

U.S. PATENT DOCUMENTS

| | | | |
|---|---|---|---|
| 5,618,074 A | 4/1997 | Weast | |
| 6,394,512 B1 | 5/2002 | Schuster | |
| 6,467,822 B1 | 10/2002 | Leng | |
| 6,503,585 B1 | 1/2003 | Wagenblast | |
| 6,513,843 B1 | 2/2003 | Frederick | |
| 6,540,275 B1 | 4/2003 | Iwamoto | |
| 6,685,243 B1 | 2/2004 | Evans | |
| 7,086,690 B2 | 8/2006 | Shuler | |
| 7,134,700 B2 | 11/2006 | Evans | |
| 7,517,006 B2 * | 4/2009 | Kageyama et al. | 296/187.09 |
| 7,520,561 B2 * | 4/2009 | Nakamae et al. | 296/193.09 |
| 7,597,383 B2 * | 10/2009 | Itou et al. | 296/187.04 |
| 7,607,720 B2 * | 10/2009 | Noyori et al. | 296/187.04 |
| 7,699,383 B2 * | 4/2010 | Fukukawa et al. | 296/187.04 |
| 2001/0026072 A1 | 10/2001 | Sato | |
| 2002/0050413 A1 | 5/2002 | Renault | |
| 2002/0125725 A1 | 9/2002 | Satou | |
| 2002/0129981 A1 | 9/2002 | Satou | |
| 2002/0180223 A1 | 12/2002 | Vismara | |

(Continued)

FOREIGN PATENT DOCUMENTS

EP 1065108 A2 1/2001

(Continued)

OTHER PUBLICATIONS

European Patent No. 16527733A1; Publication Date: May 3, 2006; Abstract Only; 1 Page.
French Patent No. 2859970A1; Publication Date Mar. 25, 2005; Abstract Only; 1 Page.

(Continued)

*Primary Examiner* — Jason S Morrow
(74) *Attorney, Agent, or Firm* — Cantor Colburn LLP (57) ABSTRACT

The present invention provides for various embodiments of a tray energy absorber comprising a base, a first transverse wall that is arcuate and extends from the base, a second transverse wall spaced apart from the first transverse wall and which extends from the base. The tray energy absorber further comprises a plurality of ribs that extend from the base joining the first transverse wall to the second transverse wall. In one embodiment the density of the ribs varies along the transverse width of the tray energy absorber. In another embodiment at least one of the plurality of ribs is greater than 50% of the height of the first transverse wall or the second transverse wall where the rib joins the first and second transverse walls. The present invention also provides for a bumper system used in a vehicle that includes a tray energy absorber attached to a bumper beam. The bumper system optionally includes a fascia that substantially envelops the bumper beam and the tray energy absorber.

30 Claims, 5 Drawing Sheets

U.S. PATENT DOCUMENTS

| | | |
|---|---|---|
| 2003/0034658 A1 | 2/2003 | Cate |
| 2003/0067179 A1 | 4/2003 | Bastien |
| 2003/0164618 A1 | 9/2003 | Gentle |
| 2004/0124643 A1 | 7/2004 | Matsumoto |
| 2006/0119116 A1 | 6/2006 | Goertz |

FOREIGN PATENT DOCUMENTS

| | | |
|---|---|---|
| EP | 1300293 | 6/2003 |
| EP | 1419936 | 5/2004 |
| EP | 1652733 A1 | 5/2006 |
| FR | 2859970 A1 | 3/2005 |
| FR | 2864811 A1 | 7/2005 |
| FR | 2887508 A1 | 12/2006 |
| WO | 2005100100 A1 | 10/2005 |
| WO | WO-2006/008150 A1 * | 1/2006 |
| WO | WO2006065868 | 11/2006 |
| WO | WO2006119225 | 11/2006 |

OTHER PUBLICATIONS

French Patent No. 2864811A1; Publication Date Jul. 8, 2005; Abstract Only; 1 Page.

International Patent No. 2006/136745A3; Publication Date Mar. 15, 2007; Abstract Only; 1 Page; Equivalent to French Patent No. 2887508A1.

International Patent No. 2005/100100A1; Publication Date Oct. 27, 2005; Abstract Only; 1 Page.

International Search Report; International Application No. PCT/US2008/084648; International Filing Date: Nov. 25, 2008; Earliest Priority Date: Dec. 19, 2007; 4 Pages.

Written Opinion of the International Search Authority; International Application No. PCT/US2008/084648; International Filing Date: Nov. 25, 2008; Earliest Priority Date: Dec. 19, 2007; 6 Pages.

* cited by examiner

TRAY ENERGY ABSORBER AND BUMPER SYSTEM

FIELD OF THE INVENTION

The present invention relates to an energy absorber. More specifically, the present invention relates to an energy absorber and a bumper system for vehicles that includes an energy absorber.

BACKGROUND OF THE INVENTION

Bumper systems typically extend widthwise, or transverse, across the front and rear of a vehicle and are mounted to rails that extend in a lengthwise direction. Many bumper assemblies for an automotive vehicle include a beam and an injection molded energy absorber secured to the beam. Assembly can further include a fascia for covering the beam and the energy absorber. The bumper assembly can further include a separately fabricated under tray, or spoiler, to prevent drag and under current beneath the car body. The under tray can also prevent debris from entering the under hood area.

Desirable energy absorbing bumper systems achieve high efficiency by building load quickly to just under the load limit of the rails and maintain that load constant until the impact energy has been dissipated. Currently, many vehicles, for example automotive vehicles, are designed with an upper and a lower energy absorber that are made to connect to the upper and lower beams, respectively. Upper and lower energy absorbers and bumper beams are commonly designed separately so that the lower energy absorber meets pedestrian impact and some vehicle safety requirements. The new legislation requires a level of pedestrian protection during impact with the front end of an automotive vehicle. The impact energy levels during such an occurrence are much lower than the traditional 5 mph vehicle bumper impacts. Legislation requirements include US FMVSS 5 miles per hour (mph) impact requirements, European ECE42 legislation, Allianz impact requirements and European and Asian Pedestrian Protection for lower and upper legs.

Traditional vehicle bumper systems and energy absorbers are designed to protect vehicle structures and/or occupants of the vehicle during low speed, about 5 miles per hour (mph), in a vehicle-to-vehicle or vehicle-to-solid structure impact. However, conventional bumper systems and energy absorbers are often too stiff to mitigate pedestrian injury, and/or are otherwise, highly complex having a large number of parts which can make them difficult and expensive to manufacture.

SUMMARY

The present invention provides for various embodiments of a unitary tray energy absorber for attachment to a vehicle. The invention also provides for various bumper systems that include tray energy absorbers. The tray energy absorbers herein have high energy absorption efficiency through fast loading of an impact force, yet are also sufficiently flexible to meet pedestrian safety requirements. The tray energy absorbers can be mounted to a lower bumper to mitigate pedestrian injury at low levels of speed, and particularly, to mitigate lower and upper leg injuries. In one embodiment of the present invention, the tray energy absorber includes a tray comprising a base, a first transverse wall that is arcuate and a second transverse wall extending upward from the base of the tray. The tray energy absorber also includes a plurality of ribs which extend upward from the base of the tray and which connect the first transverse wall to the second transverse wall.

The height of the plurality of ribs can vary, and also, the density of the ribs along the transverse wall can vary. In one embodiment height of each of the plurality of ribs is greater than 50% the height of the first transverse wall where each of the plurality of ribs joins the first transverse wall and the height of each of the plurality of ribs is greater than 50% the height of the second transverse wall where each of the plurality of ribs joins the second transverse wall. In another embodiment the density of the plurality of ribs varies along the transverse width of the tray energy absorber.

The first transverse wall is arcuate and the profile shape of the second transverse wall can vary. That is, in one embodiment of the invention the first transverse wall of the tray energy absorber is arcuate and the second transverse wall is substantially planar. In another embodiment, both the first and the second transverse walls are arcuate, and the radius of the first transverse wall is greater than the radius of the second transverse wall. The tray energy absorbers of the embodiments herein absorb impact through a combination of bending, buckling and torsion modes of deformation.

The present invention also provides for a bumper system that includes a bumper beam and a tray energy absorber of the embodiments described above. The bumper system extends widthwise, or transverse, across the front of the vehicle with the second transverse wall of the tray energy absorber proximate the bumper beam. The bumper system and is adapted for attachment to forwardly projecting supports or rails that extend outwardly from the front of the vehicle and are typically attached to the frame of the vehicle. In another embodiment the bumper system further includes a fascia that substantially envelops the bumper beam and the energy absorber.

The bumper system is desirable for applications where low levels of energy need to be absorbed, such as in the area of pedestrian protection upon impact of the front end of an automotive vehicle. Enhanced bumper impact performance translates to reduced costs of repair for low speed "fender benders" and greater occupant safety during higher speed collisions.

DESCRIPTION OF THE DRAWINGS

The various embodiments of the present invention can be understood by the following drawings and figures. The components are not necessarily to scale.

DETAILED DESCRIPTION

The present invention provides for a tray energy absorber that can be used in automotive vehicles, for example, as a component of a multi-part vehicle bumper system. The unitary tray energy absorber functions to quickly absorb impact energy while meeting pedestrian safety requirements to mitigate pedestrian leg injuries at low levels of speed. The tray energy absorber can also function as a "spoiler" to prevent formation of wakes, or low pressure zones, under the hood area of the vehicle and/or prevent foreign particles from entering the area. The tray energy absorber can be formed as a one-piece component to facilitate easier manufacturing and assembly when used in a bumper system, for example. The design and rigidity of the tray energy absorber can vary according the design of the vehicle.

Figure 1:
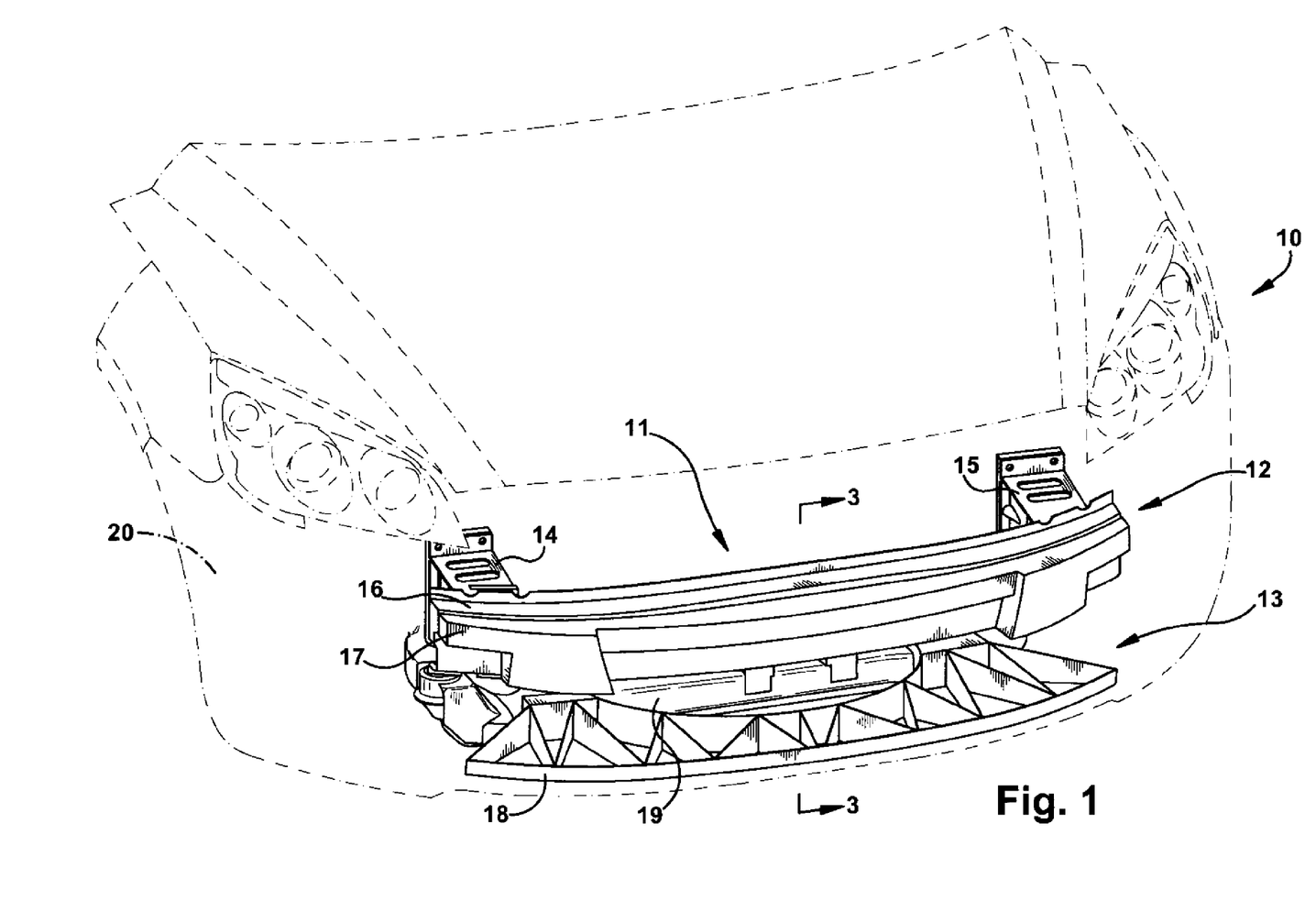
FIG. 1 is a schematic diagram of a vehicle shown in phantom which it includes an energy absorber system having an upper energy absorber and a lower tray energy absorber, according to an embodiment of the present invention.

FIG. 1 is a schematic diagram of the front portion of a vehicle 10 which shows bumper system 11 which includes an upper bumper portion 12 and a lower bumper portion 13, according to an embodiment of the present invention. The upper bumper portion 12 is connected to side rails (not shown) by brackets 14 and 15. Upper bumper portion 12 includes energy absorber 17 which is attached to the upper beam 16. Lower bumper portion 13 includes tray energy absorber 18 which is mounted to lower bumper beam 19, or alternatively to a radiator support beam (not shown). Also as shown, tray energy absorber 18 is positioned between lower bumper beam 19 and fascia 20 (shown in phantom). As understood by those skilled in the art, the reinforcing bumper beams 16 and 19 are made from a high strength material such as steel, aluminum, a composite or a thermoplastic resin and which can be connected to lower frame supports 21; however, the tray energy absorber 18 can be attached to the lower bumper portion 13 in alternative arrangements. For example, the tray energy absorber 18 can be connected to the radiator support beam (not shown). The tray energy absorber 18 at least partially absorbs the kinetic impact energy as it is transferred through the bumper system and into the vehicle frame.

Figure 2:
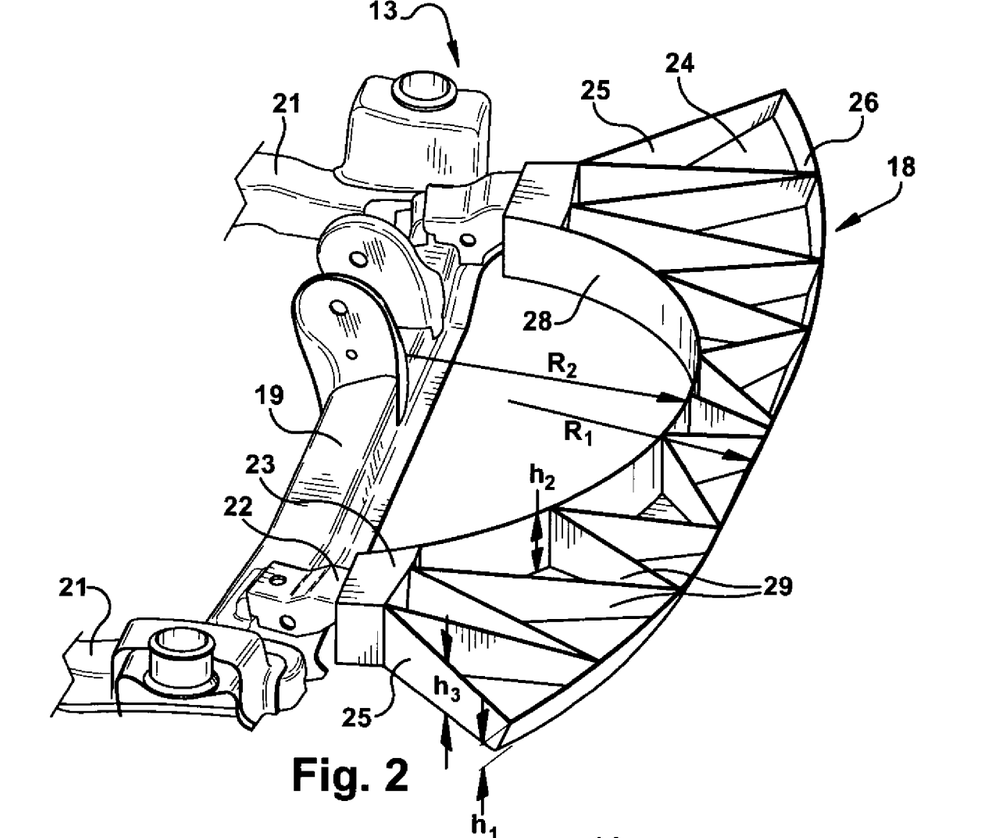
FIG. 2 is a perspective view of the lower tray energy absorber of the energy absorber system shown in FIG. 1, according to an embodiment of the present invention.

FIG. 2 is a perspective view of lower bumper portion 13 shown in FIG. 1, according to an embodiment of the present invention. Lower bumper beam 19 is connected to lower vehicle frame supports 21 and tray energy absorber 18 is connected to lower bumper beam 19 by connectors 22 which extend from the bumper beam 19 to the sleeve portion 23 of the tray energy absorber 18. Tray energy absorber 18 includes base 24, first transverse wall 26 and second transverse wall 28 which extend upward from base 24. Lower tray energy absorber 18 also includes a plurality of ribs 29 which connect the first transverse wall 26 to the second transverse wall 28. Ribs 29 also include, for example, end walls 25.

In one embodiment, both the first transverse wall 26 and second transverse wall 28 are arcuate. The radius, $R_1$, of the first transverse wall 26 is greater than the radius, $R_2$, of the second transverse wall 28. The tray energy absorber 18 absorbs energy by the bending of the arcuate, i.e. "arched" transverse wall 26, and/or bending both the first transverse wall 26 and the second transverse wall 28 in tandem. The transverse walls 26 and 28 primarily absorb energy by first bending upon impact but can also absorb energy by twisting and buckling. That is during impact, transverse walls 26 and 28 bend about a vertical axis through support points, for example, where sleeve portion 23 of the tray energy absorber is fixed to connectors 22 and bumper beam 19. The tray energy absorber 18 may move up and/or down in a twisting or "torque" motion about a horizontal axis which extends through two or more support points. Also the tray energy absorber may crunch in a buckling motion about one or more pivot points where the tray energy absorber connects to the bumper beam. Deformation occurs within the plastic range of the material of the tray energy absorber 18.

As shown, the plurality of ribs 29 are oriented at an angle relative to one another, for example in a "V" shape as shown, or in another example as cross-ribs such as in an "X" shape, facilitate bending and to increase the energy absorption efficiency. The stiffness of the energy absorber can be tailored to meet various requirements depending upon several variables, including but not limited to, the number of ribs, the thickness of ribs and the type of material, for example. The height, $h_3$, of the plurality of ribs is at least about 50%, in another embodiment at least about 80%, in another embodiment approximately equal to at least one of the first and second transverse walls having height, $h_1$, and $h_2$, respectively.

Figure 3:
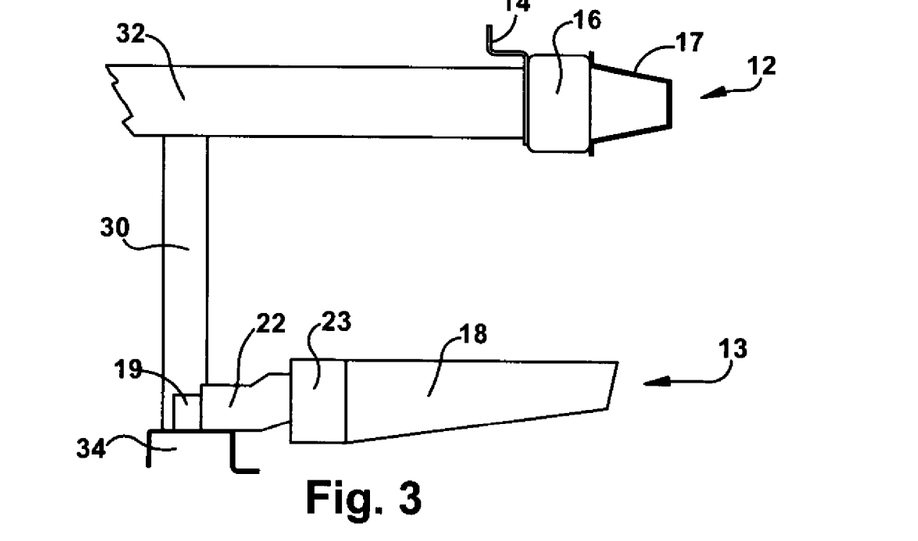
FIG. 3 is a cross-sectional view of the energy absorber systems taken along line 3-3 of FIG. 1 showing the positioning of the lower tray energy absorber below the upper energy absorber, according to an embodiment of the present invention.

FIG. 3 is a cross-sectional view taken along lines 3-3 of FIG. 1. The upper bumper portion 12 is connected to the lower bumper portion 13 of the bumper system 11 by a vertical member 30 that extends between upper frame supports 32 and lower frame supports 34. Vertical member 30 is located between upper and lower frame supports 32 and 34 and can optionally join to one or both of the frame supports. Upper bumper portion 12 includes upper frame supports 32, optionally, flange 14, upper bumper beam 16 and energy absorber 17. Lower bumper portion 13 includes tray energy absorber 18, bumper beam 19, connector 22 that is disposed between the bumper beam 19 and sleeve portion 23 of tray energy absorber. However, alternative methods of connection between the tray energy absorber 18 and the bumper beam 19, and at alternative locations along the bumper beam are possible.

Figure 4:
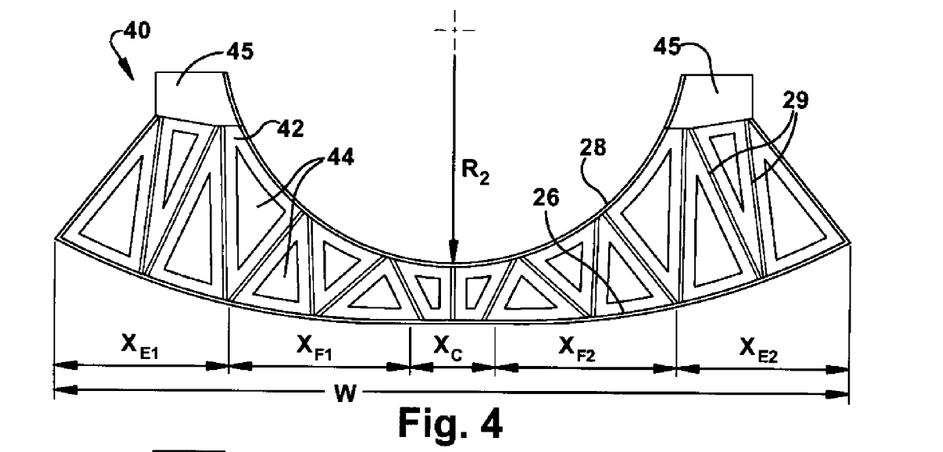
FIG. 4 is a top view of the lower tray energy absorber of FIG. 2, according to an embodiment of the invention.

FIG. 4 is a top view of a tray energy absorber 40 according to another embodiment of the invention. Tray energy absorber 40 includes base 42 having a plurality of openings 44 thereby reducing the mass of the tray energy absorber and bumper system. The openings in the base of the tray energy absorber 40 also facilitate localized deformation upon impact. The localized deformation results in greater localized bending and plastic deformation of the tray energy absorber 40 about the pivot points, for example about sleeve portion 45. The tray energy absorber 40, similar to tray energy absorber 13 of FIGS. 1-3 includes arcuate transverse walls 26 and 28 spaced apart from one another, and a plurality of ribs 29 which connect the first transverse wall 26 to the second transverse wall 28.

As described above with respect to FIGS. 1 and 2, the gap between the second transverse wall 28 and the bumper beam of a bumper system facilitates a two-step energy absorption reaction. Initially, crushing and bending of the tray energy absorber will be dominant until the gap is at least partially closed and the second transverse wall contacts the bumper beam. Then twisting/torsion and crushing will prevail to absorb additional energy. That is, as the tray energy absorber bends rearward it may assume a more vertical orientation as the leading edge slides upward or downward on the impactor, for example a pedestrian leg, until maximum deflection is achieved.

The tray energy absorber 40 can be modified or tailored for specific applications by varying the angle of the ribs 29. That is, the ribs 29 are shown oriented at and angle relative to one another. The ribs 29 are shown to contact one another, however, in alternative embodiments the ribs may intersect or they may not contact one another. In yet an alternative embodiment, ribs 29 may be substantially parallel to one another between transverse walls 26 and 28. The flexibility of the tray energy absorber can be tuned via a variety of methods. These methods include, but are not limited to, varying the design and orientation of the ribs 29 as described above, for example, varying the number of openings 44 in the base 42, varying the thickness of the base 42, the transverse walls 26, 28 and the ribs 29, and also by selection of the thermoplastic material to be used.

FIG. 4 shows several zones along the transverse width, W, of tray energy absorber 40. For example, the center zone of the tray energy absorber is denoted by $X_C$, the end zones of the tray energy absorber are denoted by $X_{E1}$ and $X_{E2}$, and the intermediate zones are denoted by $X_{F1}$ and $X_{F2}$. The stiffness or rigidity of these various zones can each be altered to yield crash results in bumper systems to achieve improved energy absorption efficiency upon impact. For example, if the center and end portions of the bumper system require greater stiffness or rigidity based on the vehicle design and geometry, the center zone $X_C$ and also the end zones $X_{E1}$ and $X_{E2}$ can be more rigid than the interior zones $X_{F1}$ and $X_{F2}$ which can be more flexible and vice-versa. Any of the zones can vary in stiffness or maintain the same stiffness relative to one another. The ribs, for example ribs 29 of tray energy absorber 18 and 40, can be spaced apart in varying distances, or can have varying wall thicknesses to produce various rib densities. By "rib density" it is meant herein the rib mass per unit distance across the transverse width, W, of the tray energy absorber. The rib density can vary along the width, that is, along the first and second transverse walls, of the tray energy absorber. For example, in one embodiment, tray energy absorber 40 can have ribs 29 spaced further apart along the interior zones $X_{F1}$ and $X_{F2}$ than the rib spacing between end zones $X_{E1}$ and $X_{E2}$ and center zone $X_C$, however, the spacing can vary in any of the zones.

Figure 5:
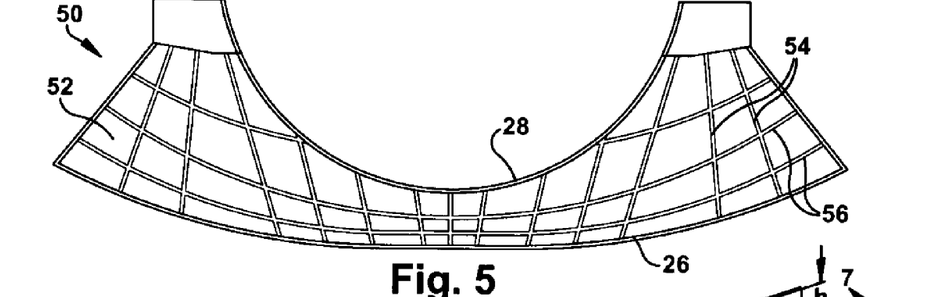
FIG. 5 is a top view of an alternate energy absorber having transverse ribs, according to an embodiment of the present invention.

Tray energy absorber 50 of FIG. 5, according to another embodiment of the present invention, includes a base 52, a first transverse wall 26 and a second transverse wall 28 and a plurality of ribs 54. Compared to tray energy absorber 40, the tray energy absorber 50 further includes a plurality of interior transverse walls 56 which are disposed between the first transverse wall 26 and the second transverse wall 28. Some of the ribs 29 which connect the transverse walls 26 and 28 are substantially parallel to one another while others are oriented at an angle relative to one another. As shown, none of the ribs 29 contact one another, however, in alternative embodiments, some or all of the ribs 29 may contact one another. The interior transverse walls 56 may also be present in the tray energy absorbers 18 (FIG. 2) and 40 (FIG. 4).

Figure 6:
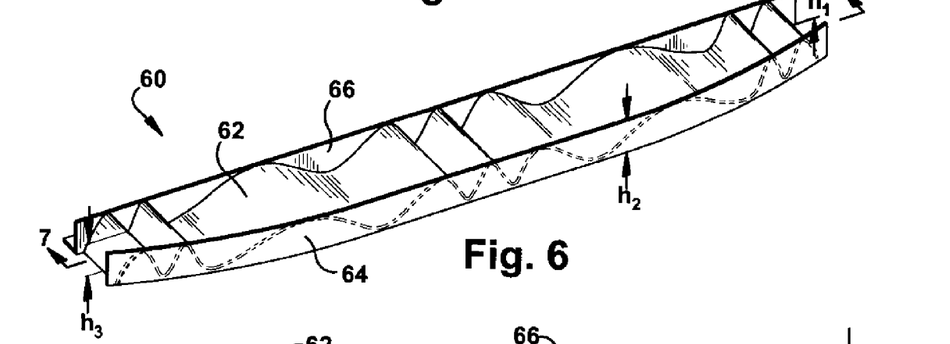
FIG. 6 is a perspective view of a lower tray energy absorber having a waved base, according to an embodiment of the invention.

FIG. 6 is a perspective view of a tray energy absorber 60 having a base 62 which is rippled, and a first transverse wall 64 which is arcuate, and second transverse wall 66, according to another embodiment of the present invention. Second transverse wall 66, which faces the bumper beam (not shown) when mounted to a vehicle, is shown to be substantially planar, however, both transverse walls 64 and 66 can be arcuate. Also, first transverse wall 64 can be substantially planar or can be arcuate as shown. The rippled base 62 includes alternating raised areas and depressed areas that provide the transverse walls with an added degree of stiffness to resist deflection upon impact. The width and the depth dimension of the ripples can be modified to achieve different stiffness characteristics as desired. For example, the height $h_3$ of the ripple of base 62 can be the same or a fraction of the height of the first and second transverse walls, 66, 64, having height $h_1$ and $h_2$, respectively. As shown, the height of the ripple of base 62 as shown in FIG. 6 is substantially equal to the height of transverse walls 64 and 66. Energy absorber 60 as shown has no ribs, however, in alternative embodiments reinforcing ribs that extend between transverse walls 64 and 66 may also be present.

Figure 7:
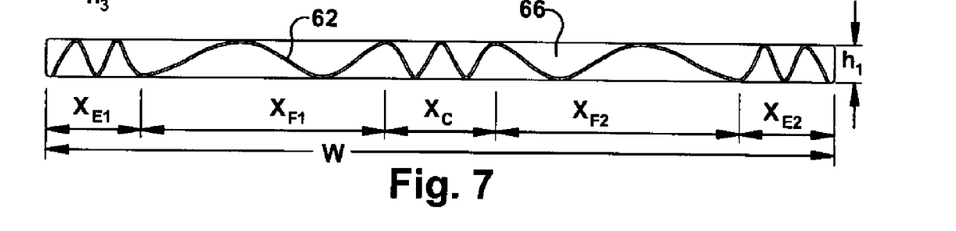
FIG. 7 is a cross-sectional view of the tray energy absorber taken along line 7-7 of FIG. 6 according to an embodiment of the present invention.

FIG. 7 is a cross-sectional view of the tray energy absorber 60 taken along line 7-7 of FIG. 6. Cross-sectional view shows the ripples of the transverse base 62 are varied along the transverse width, W, of the tray energy absorber 60. That is, the stiffness or rigidity of tray energy absorber 60 can be constant, and alternatively, can vary along the transverse width. As shown, the ripples are tighter, having a smaller radius, at the center zone $X_C$ and the end zones $X_{E1}$ and $X_{E2}$ of the tray energy absorber, and larger, having a relatively greater radius, at the interior zones $X_{F1}$ and $X_{F2}$. This results in a tray energy absorber that is designed to be stiffer in the center and the end zones compared to the interior zones $X_{F1}$ and $X_{F2}$ which are more flexible. As mentioned above, the stiffness or rigidity of any of the zones such as the end zones $X_{E1}$ and $X_{E2}$, the center zone $X_C$, and the interior zones $X_{F1}$ and $X_{F2}$. can vary in stiffness or maintain the same stiffness relative to one another.

Figures 8, 9, 10, 11, 12, 13, 14:
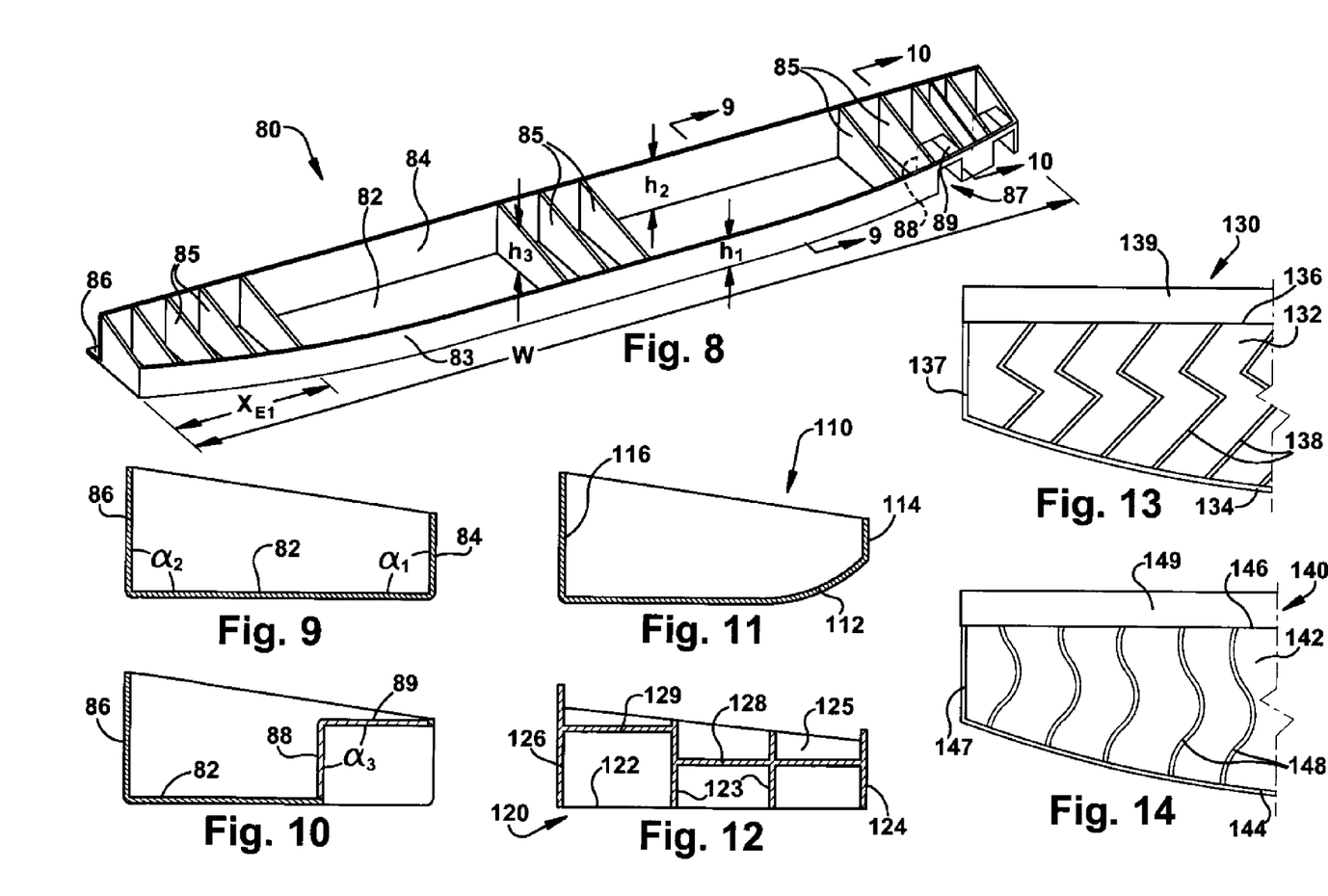
FIG. 8 is a perspective view of a tray energy absorber having a transverse ribs substantially planar transverse wall, according to an embodiment of the present invention.
FIG. 9 is the cross section of the tray energy absorber taken along lines 9-9 of FIG. 8, according to an embodiment of the invention.
FIG. 10 is a cross-sectional view of the tray energy absorber taken along lines 10-10 of FIG. 8, according to an embodiment of the invention.
FIG. 11 is a cross-sectional view of a tray energy absorber, according to an embodiment of the invention.
FIG. 12 is a cross-sectional view of a tray energy absorber showing stepped ribs, transverse and horizontal ribs, according to an embodiment of an invention.
FIG. 13 is a top view of a portion of the an energy absorber showing an alternative zig-zag rib design, according to an embodiment of the present invention.
FIG. 14 is a top view of a portion of the an energy absorber showing an alternative curved rib design, according to an embodiment of the present invention.

FIG. 8 is a perspective view of a tray energy absorber 80 according to another embodiment of the present invention. Tray energy absorber 80 includes a base 82, first transverse wall 83 and second transverse wall 84. A plurality of ribs 85 connects the first transverse wall 83 to second transverse wall 84. Ribs 85 can be spaced apart in varying distances, or can have varying wall thicknesses to produce varying rib densities. By "rib density" it is meant herein the rib mass per unit distance across the transverse width, W, of the tray energy absorber. The rib density can vary along the width, that is, along the distance across the first and second transverse walls, of the tray energy absorber 80. For example, in one embodiment, tray energy absorber 80 is shown having a plurality of ribs 85 grouped at the end zones, for example at end zone $X_{E1}$ and $X_{E2}$ and at the center zone $X_C$ which results in more rigid portions of the tray energy absorber.

FIGS. 9 through 12 are cross-sectional views of various tray energy absorber configurations. FIG. 9 is a cross-sectional view of the tray energy absorber, 80 taken along lines 9-9 of FIG. 8 and showing the base 82 and the first transverse wall 83 and the second transverse wall 84. First transverse wall 83 and second transverse wall 84 are oriented at an angle relative to base 82. As shown, the first and second transverse walls 83, 84 are oriented approximately 90 degrees relative to the base 82, however the first and second transverse walls can be oriented at an angle, for example angles $\alpha_1$ and $\alpha_2$, respectively, relative to the base 82 at any angle which ranges from about 10 degrees to 170 degrees, in another example from about 45 degrees to about 135 degrees relative to the base 82.

FIG. 10 is a cross-section of the tray energy absorber 80 taken along lines 10-10 of FIG. 8. Referring to FIG. 8, the profile cross-section of a portion of tray energy absorber 80 includes a step 87. Step 87 is shown located between two ribs 85 along end zone $X_{E2}$, however, step 87 and/or additional steps may be located anywhere along the transverse width, W of first transverse wall 83. The cross-section of FIG. 10 shows step 87 is formed by wall segments 88 and 89 which are oriented at an angle, $\alpha_3$, relative to one another. As shown wall segments 88 and 89 are substantially perpendicular to one another, however in alternative embodiments, the wall segments can be oriented at an angle that ranges from about 45 degrees to about 135 degrees relative to one another. The presence of step 87 increases the rigidity of the structure and can help facilitate efficient energy absorption. The base 82 of tray energy absorber 80 shown in FIGS. 8 through 10 is substantially planar, however, FIG. 11 illustrates a tray energy absorber 110 having a base 112 that is at least partially arcuate.

The cross-sectional view of tray energy absorber 120 of FIG. 12 shows ribs which extend in at least two directions between first transverse wall 124 and second transverse wall 126. Vertical rib 125 extends from the first transverse wall 124 to the second transverse wall 126 and lateral ribs 128 and 129 extend along at least a portion of the transverse width of the energy absorber 120. Lateral ribs 128 and 129 can extend between first and second transverse walls 124 and 126, between interior transverse walls 123, and/or combinations thereof. Lateral ribs 128 and 129 are shown disposed at two different elevations; however, they may also be co-planar. The lateral ribs disposed at varying elevations facilitates additional twisting or "torque" load on the tray energy absorber 120 upon impact. Lateral ribs 128 and 129, for example, can serve as the base of the tray energy absorber 120 if base 122 is not present. Lateral ribs 128 and 129 as well as base 122 can include one or more openings. The rigidity of the tray energy absorber can be tailored according to the needs of the application, for example, by increasing or decreasing the number and/or thickness of the vertical and lateral ribs to tune the energy absorption.

The tray energy absorber 130 of FIG. 13 has first transverse wall 134 that is curved and second transverse wall 136 which is substantially planar. Tray energy absorber 130 has a plurality of zig-zag shaped ribs 138 which extend from the first transverse wall 134 to the second transverse wall 136 and which have a zig-zag profile along a lateral cross-section. End wall 137 connects the front transverse wall 134 to the rear transverse wall 136. Flange 139 can be used for mounting the tray energy absorber to the bumper beam (not shown).

FIG. 14 is a cross-sectional view of tray energy absorber 140 that has a first transverse wall 144 and a second transverse wall 146. Tray energy absorber 140 includes a plurality of ribs 148 which extend from the first transverse wall 144 to the second transverse wall 146 and which have a curvilinear profile along a lateral cross-section. The curved shape of the ribs 148 facilitates collapsibility similar to the zig-zag shaped vertically extending walls 138 of FIG. 13. These zig-zag and curvilinear profiles of the ribs 138 and 148 deforms in buckling mode upon impact.

In the embodiments described above in which the first transverse wall is arcuate and the second transverse wall is substantially planar, the second transverse wall is positioned substantially flush against a bumper beam in a bumper system. In such case, the crushing and twisting/torsion motion will be dominant modes of energy absorption. It is likely that intermittent gaps between the second transverse wall and the bumper beam are present. In such case the tray energy absorber will behave similar to the embodiments in which the second transverse wall is arcuate and will undergo bending in addition to twisting and crushing to absorb additional energy.

Figure 15:
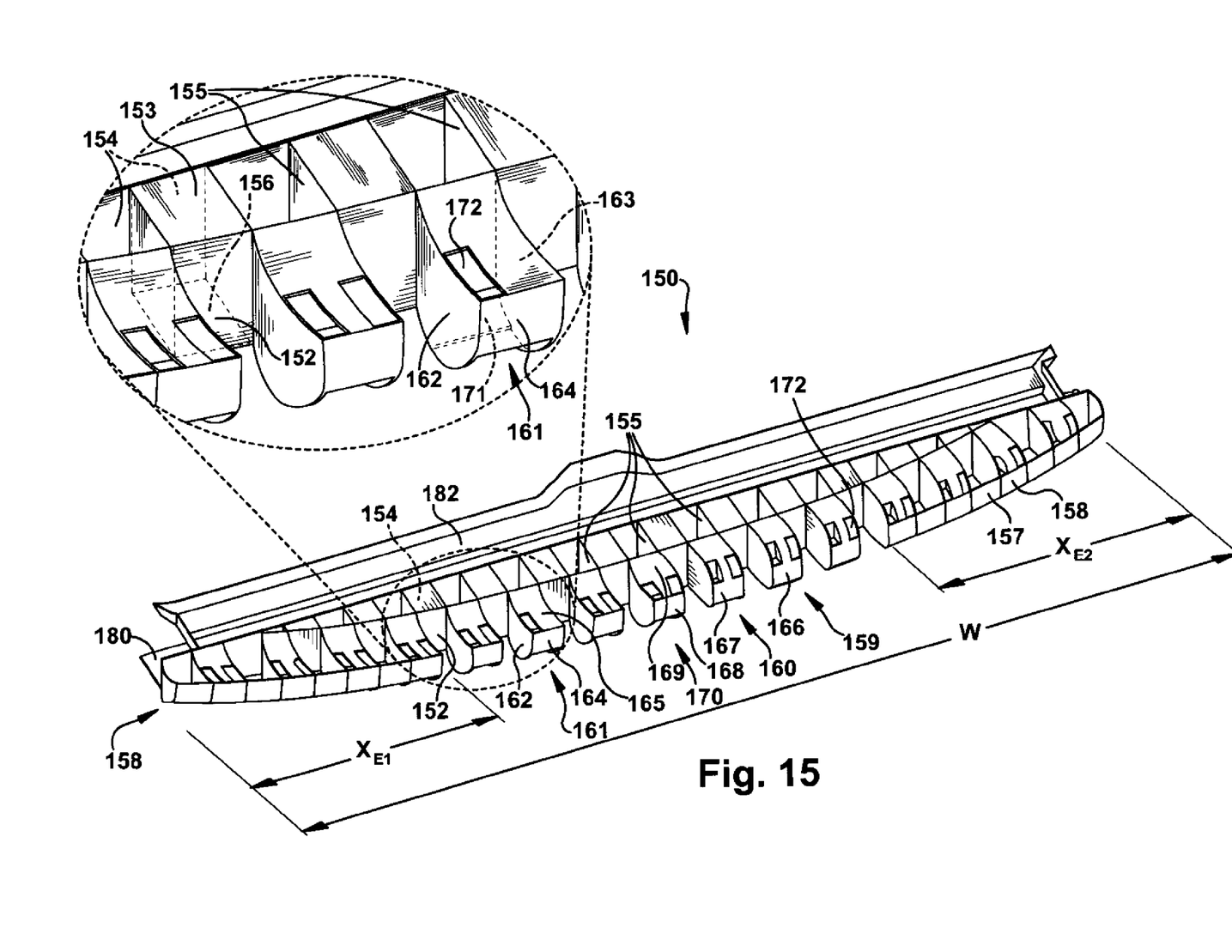
FIG. 15 is a perspective view of an energy absorber having a plurality of lobes extending from the transverse wall, according to an embodiment of the present invention.

FIG. 15 is a perspective illustration of tray energy absorber 150 having a first transverse wall 152, a second transverse wall 154, and a plurality of ribs 155 which extend vertically between the first transverse wall and the second transverse wall. The close-up view of a portion of tray energy absorber 150 shows that the tray energy absorber optionally includes a top 153, and a base 156 (shown in phantom) which extend horizontally between at least a portion of the first and second transverse walls. If base 156 is present, it can include openings such as, for example, openings 44 of the base 42 of tray energy absorber 40 shown in FIG. 4 above. In one embodiment, first transverse wall 152 is arcuate and second transverse wall 154 is substantially planar, and in another embodiment both the first and second transverse walls 152, 154 are arcuate. Tray energy absorber 150 further includes a plurality of crush lobes 158 disposed along an outer surface of the first transverse wall 152 which is opposite an inside surface of wall 152 which faces the second transverse wall 154. Two or more crush lobes, for example crush lobes 157 and 158 can contact one another as shown along the end zones $X_{E1}$ and $X_{E2}$ of the tray energy absorber 150. The crush lobes may also be spaced apart, for example, crush lobe 159 which is spaced a distance from crush lobe 160.

The crush lobes, for example crush lobe 161, include one or more side walls, for example side walls 162 and 163 (shown in phantom) which extend outwardly from the first transverse wall 152, and a front wall 164 which optionally includes an upper face portion 165. The front wall 164 and/or the upper face portion 165 can be concave, for example, as shown by the concave upper face portion 165, or may be convex, for example convex front walls 166 and 167 of crush lobes 159 and 160, respectively, or may be substantially planar, for example front wall 168 and/or upper face portion 169 of crush lobe 170. The crush lobes optionally include a bottom, for example bottom 171 (shown in phantom), which extends between sidewalls 162 and 163 of crush lobe 161. The bottom can include at least one opening (not shown). In any of the embodiments described above, the crush lobes may further include one or more openings, for example window opening 172. Crush lobes may also be closed to define a hollow cavity (not shown).

The second transverse wall 154 shown in FIG. 15 extends along a portion of transverse width, W, of the tray energy, absorber 150, however, in an alternative embodiment the second transverse wall 154 can be spaced apart from the first transverse wall 152 along the entire transverse width, W, of the tray energy absorber. Tray energy absorber 150 can also include a flange 180 which may be mounted to a bumper beam 182.

Crush lobes can have a number of different geometries depending on the impact energy requirements for the vehicle. The crush lobes can be tuned by varying the size, shape, and position of openings in one or more of the side walls, front wall, and bottom. Impact energy is absorbed by the tray energy absorber 150 primarily by buckling, but also by bending about a vertical axis and by twisting or torque up and/or down (i.e. torsion) about an axis which extends between pivot points where the tray energy absorber is secured to the bumper beam. When an object or impactor strikes the bumper system, the crush lobes are urged toward the first and second transverse walls and the lobes pivot with respect to the first transverse wall to absorb energy.

In any of the tray energy absorbers described above, for example, tray energy absorbers 18 (FIG. 2), 40 (FIG. 4), 50 (FIG. 5), 60 (FIG. 6), 80 (FIG. 8), 110 (FIG. 11), 120 (FIG. 12), 130 (FIG. 13), 140 (FIG. 14), and 150 (FIG. 15), the base can include openings, such as for example, openings 44 as shown and described above with respect to tray energy absorber 13 (FIG. 2). In addition, the several rib configurations described in FIGS. 1, 2, 4, 5, and 8 through 15 can also be applied to any of the tray energy absorbers described above in FIGS. 1 through 15 having a first transverse wall which is arcuate and a second transverse wall which is planar or arcuate. The density of each of the plurality of ribs can be constant or can vary along the transverse width of the energy absorber. Any of the above tray energy absorbers can further include one or more crush lobes which extend outward from the first transverse wall as in tray energy absorber 150 of FIG. 15.

Also, in the various embodiments described above, the height of at least one of the plurality of ribs is greater than 50%, in another embodiment greater than about 80%, and in another embodiment substantially the same as the height of the first transverse wall at the location where at least one of the plurality of ribs joins the first transverse wall, and the height of at least one of the plurality of ribs is greater than 50% the height of the second transverse wall where at least one of the plurality of ribs joins the second transverse wall of the tray energy absorber. As mentioned above, the height of the first and second transverse walls may be different or substantially equal.

In the embodiments described above, first and second transverse walls of FIGS. 1 through 15 are shown oriented approximately 90 degrees relative to the base, however they can be oriented at various angles relative to the base, for example oriented at an angle which ranges from about 10 degrees to 170 degrees, in another example from about 45 degrees to about 135 degrees, and about 90 degrees relative to the base 82 as shown.

The average wall thickness of the tray energy absorber in the above embodiments can vary depending upon the material of construction. For example, where the tray energy absorber is thermoplastic, the average wall thickness can range from about 1 millimeter to about 7 millimeters, in another embodiment from about 1.5 millimeters to about 6 millimeters, and in yet another example can range from about 2 millimeters to about 3 millimeters thick. The thickness of the base 24 likewise ranges from about 1 millimeter to about 7 millimeters, and in another example, ranges from about 1.5 millimeters to about 6 millimeters, and in yet another example ranges from about 2 millimeters to about 3 millimeters thick. The wall thickness of the plurality of ribs, for example the plurality of ribs 29 (FIG. 2) of tray energy absorber 13, can vary from about 40% to about 100% of the thickness of the base 24 (FIG. 2) at the rib-base joining area. In another embodiment, the rib thickness can vary from about 50% to about 90% of the thickness of the base, an in another embodiment from about 60% to about 80% the thickness of the base at the rib-base joining area. The wall thickness of the rib can be reduced, i.e. taper, at a distance further from the rib-base joining area, such that the wall thickness of the rib is less than 40% of the thickness of the base, for example, and from about 20% to about 90% of the thickness of the base.

The various embodiments of the tray energy absorbers described above can be appropriately tuned to absorb various amounts of energy by design factors such as the selection of the thermoplastic material that is used, the cross-sectional area of the tray energy absorber which may vary over the transverse width, and the geometry of tray energy absorber relative to the bumper, for example. Thermoplastic material may be a low modulus, medium modulus, or high modulus material as needed. By carefully considering each of these variables, energy absorbers meeting desired energy impact objectives could be manufactured. Considerations of material utilized can include toughness, ductility, thermostability, energy absorption capacity, modulus to elongation ratio, and recyclability, for example. The tray energy absorber may be molded in a unitary construction made from a single material, or may also be made or molded in portions and assembled.

While the energy absorber may be molded in segments, it is preferably that it be of unitary construction made from a tough plastic material. Materials that are useful for molding the energy absorber include engineering thermoplastic resins. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide, polyether imide (PEI), blends of polycarbonate/PET/PBT, polybutylene terephthalate, polyamides, phenylene sulfide resins, polyvinyl chloride PVC, high impact polystyrene (HIPS), low/high density polyethylene (LDPE, HDPE), polypropylene (PP) and thermoplastic olefins (TPO), among others.

The various tray energy absorbers described above, can achieve efficient energy absorption upon impact with a pedestrian leg. Regulatory requirements define damage to the leg in terms of leg acceleration or force, knee rotation and knee shear. The tray energy absorbers herein are designed to deform in a controlled manner through bending, or buckling or twisting, or any combinations of these. It is desirable that once the impact is over the tray energy absorber returns substantially to its original shape and retains sufficient integrity to withstand subsequent impact.

While embodiments of the invention have been described, it would be understood by those skilled in the art that various changes may be made and equivalence may be substituted for the energy absorber or system thereof without departing from the scope of the invention. For example, although example embodiments discussed above pertain to vehicles, it should be understood that several other applications may find use of the energy absorbing unit and energy absorbing system. Also, several different polymers may be used. In addition, many modifications may be made to adapt a particular situation of material to the teachings of the invention without departing from the essential scope thereof. Therefore, it is intended that the invention not be limited to particular embodiments, but that the invention will include all embodiments falling within the scope of the pending claims.

What is claimed is:

1. A tray energy absorber comprising:
a base;
a first transverse wall which is arcuate and extending upward from the base;
a second transverse wall which is arcuate extending upward from the base, the first transverse wall spaced from the second transverse wall;
a plurality of ribs which extend upward from the base of the tray and connect the first transverse wall and the second transverse wall; and
a sleeve portion adjacent the second transverse wall and designed to connect to a bumper beam such that the second transverse wall is spaced apart from the bumper beam;

wherein the height of each of the plurality of ribs is greater than 50% the height of the first transverse wall where the rib joins the first transverse wall and the height of each of the plurality of ribs is greater than 50% the height of the second transverse wall where the rib joins the second transverse wall.

2. The tray energy absorber of claim 1, further comprising lobes disposed along the surface of the first transverse wall facing opposite the second transverse wall.

3. The tray energy absorber of claim 1, wherein the plurality of ribs are oriented at an angle relative to one another.

4. The tray energy absorber of claim 1, wherein the plurality of ribs are substantially parallel to one another.

5. The tray energy absorber of claim 1, wherein the plurality of ribs have a curvilinear profile along a lateral cross-section.

6. The tray energy absorber of claim 1, wherein the plurality of ribs have a zig-zag profile along a lateral cross-section.

7. The tray energy absorber of claim 1, wherein the plurality of ribs are substantially equidistant from one another.

8. The tray energy absorber of claim 1, wherein the wall thickness of tray energy absorber ranges from about 1 mm to about 6 mm.

9. The tray energy absorber of claim 1, wherein the tray energy absorber has plurality of zones along the transverse width of the tray energy absorber, and at least two of the zones have a different rigidity.

10. The tray energy absorber of claim 9, wherein the tray energy absorber comprises a central zone, a first end zone, and a second end zone, and wherein the rigidity of the central zone is different than at least one of the first end zone and the second end zone.

11. The tray energy absorber of claim 9, wherein:
the tray energy absorber comprises a central zone, a first end zone, and a second end zone, a first intermediate zone disposed between the central zone and the first end zone, and a second intermediate zone disposed between the central zone and the second end zone; and
the rigidity of each of the zones is different than its adjacent zones.

12. The tray energy absorber of claim 1, further comprising: a plurality of intermediate transverse walls disposed between the first transverse wall and the second transverse wall.

13. The tray energy absorber of claim 1, wherein the ribs are oriented at an angle which ranges from about 10 degrees to about 170 degrees relative to the base.

14. The tray energy absorber of claim 1, wherein the transverse wall is oriented at an angle which ranges from about 10 degrees to about 170 degrees relative to the base.

15. The tray energy absorber of claim 1, wherein the base is substantially planar.

16. The tray energy absorber of claim 1, further comprising a plurality of lobes disposed along the surface of the first transverse wall facing opposite the second transverse wall; and
wherein the base comprises at least one opening and the at least one of the plurality of lobes comprises an opening.

17. The tray energy absorber of claim 15, wherein the base comprises at least one opening.

18. A bumper system comprising:
the tray energy absorber of claim 1; and
a bumper beam.

19. The bumper system of claim 18, further comprising a fascia attached to the tray energy absorber to substantially envelop the bumper beam and the energy absorber.

20. The bumper system of claim 18 further comprising a second bumper beam and a second tray energy absorber.

21. A tray energy absorber comprising:
a base;
a first transverse wall which is arcuate and extending upward from the base;
a second transverse wall extending upward from the base, the first transverse wall spaced from the second transverse wall;
a plurality of ribs which extend upward from the base of the tray and connect the first transverse wall and the second transverse wall;
a sleeve portion adjacent the second transverse wall and designed to connect to a bumper beam such that the second transverse wall is spaced apart from the bumper beam; and
wherein the density of the plurality of ribs varies along the transverse width of the tray energy absorber.

22. A bumper system comprising:
the tray energy absorber of claim 21; and
a bumper beam.

23. The bumper system of claim 22, further comprising a fascia attached to the tray energy absorber to substantially envelop the bumper beam and the energy absorber.

24. The bumper system of claim 22, further comprising a second bumper beam and a second tray energy absorber.

25. The tray energy absorber of claim 1, wherein the density of the plurality of ribs varies along the transverse width of the tray energy absorber.

26. The tray energy absorber of claim 1, wherein the first transverse wall and the second transverse wall are the outer most transverse walls of the tray energy absorber.

27. The bumper beam system of claim 18, wherein the second transverse wall comprises a portion that is spaced apart from the bumper beam.

28. The tray energy absorber of claim 1, wherein the first transverse wall and the second transverse wall extend only upward from the base.

29. The tray energy absorber of claim 1, wherein the first transverse wall has a height $h_1$ and the second transverse wall has a height $h_2$ that is different than $h_1$.

30. The tray energy absorber of claim 29, the outermost ribs have a height wherein the outermost rib joins the first transverse wall that is equal to $h_1$, and a height wherein the outermost rib joins the second transverse wall that is equal to $h_2$.

* * * * *